Sept. 20, 1966 S. P. BECKER ETAL 3,274,330
INSULATED CABLE SPLICE

Filed April 24, 1964 2 Sheets-Sheet 1

INVENTOR.
STEPHEN P. BECKER
BERTRAM A. FULTON
BY
Kane, Dalsimer & Kane
ATTORNEYS.

Sept. 20, 1966     S. P. BECKER ETAL     3,274,330
INSULATED CABLE SPLICE

Filed April 24, 1964     2 Sheets-Sheet 2

INVENTOR.
STEPHEN P. BECKER
BERTRAM A. FULTON
BY
Kane, Dalsimer & Kane
ATTORNEYS United States Patent Office 3,274,330
Patented Sept. 20, 1966

1

3,274,330
INSULATED CABLE SPLICE
Stephen P. Becker, Poughkeepsie, N.Y., and Bertram A. Fulton, Lynnfield, Mass., assignors to Fargo Mfg. Company, Inc., Poughkeepsie, N.Y., a corporation of New York
Filed Apr. 24, 1964, Ser. No. 362,256
5 Claims. (Cl. 174—84)

This invention relates generally to cable splices and more particularly to such a cable splice provided with an insulating and sealing covering rolled thereon.

Splices are made for various purposes in the electrical industry for both non-tension and tension connections of wires and cables. The word "splice" as used herein should be understood to include any means for fastening two wires together, end to end, for purposes of providing an electrical connection. In such an application it is often necessary to provide electrical insulation weather sealing about the exterior of the splice.

The invention herein disclosed has as its principal object the provision of an insulated cable splice utilizing a rolled elastomeric sleeve assembled to one of the cables or to a connector prior to making the splice and which sleeve provides the insulation and the sealing.

Another object of this invention is to provide a splice assembly which is easy to use and which will be properly insulated and sealed.

A further object of this invention is to provide insulation for a compression connector when used to make a splice which will completely cover the connector and in which there is no danger of punching holes through the insulation while crimping the connector since the sleeve insulation is not in place during the crimping operation, although it is semi-permanently assembled to the connector.

An insulated cable splice embodying the invention and the manner of using the same is described herein with references to the drawings, in which.

2

Figure 10:
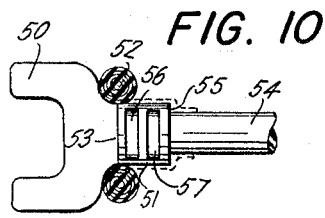

FIG. 10 is an embodiment of the invention applied to a lugtype connector; and

Figure 11:
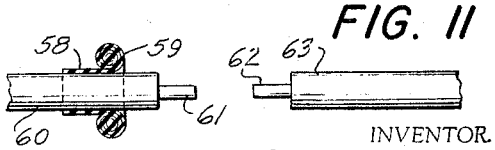

FIG. 11 is another embodiment of the invention wherein the rolled insulating sleeve is applied directly to one of the conductors of the splice.

Figure 1:
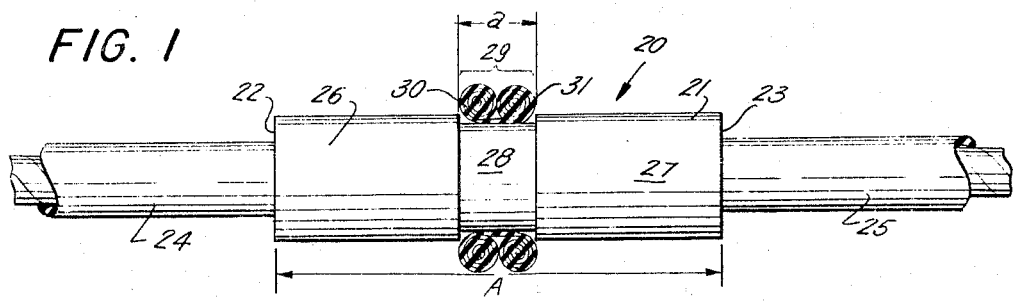
FIG. 1 is a side view of one embodiment of the invention utilizing a compression connector shown prior to crimping of the connector.
Figure 2:
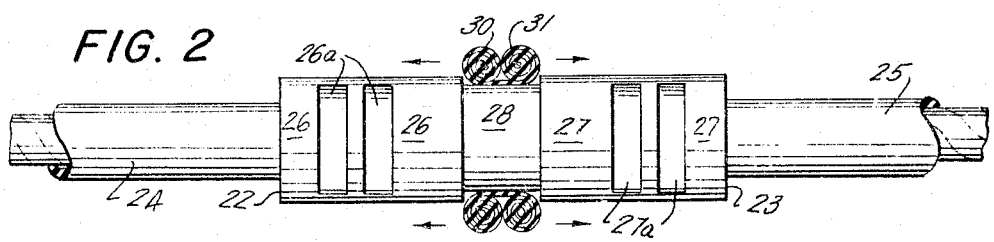
FIG. 2 is a side view of the connector shown in FIG. 1 after crimping.
Figure 3:
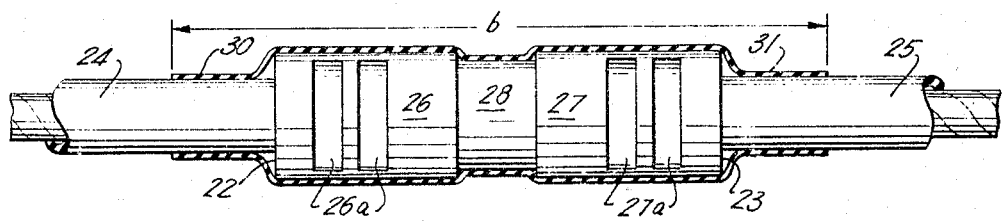
FIG. 3 is a side view of the assembly shown in FIGS. 1 and 2 with the insulation in final insulating and sealing position.

In FIGS. 1–3, connector 20 includes a cylindrical body 21 formed of a crimpable or deformable material having longitudinal bore or cavity entrances 22 and 23 receiving cable ends 24 and 25 within the cavities in crimpable sections 26 and 27 of the connector respectively. The material from which the body 21 is formed is usually electrically conductive. The crimpable sections are separated by a depressed zone 28 of the body providing a single cylindrical channel for receiving elastomeric sleeve 29 having ends 30 and 31 rolled toward one another.

The sleeve is formed of a non-conducting or insulating material and its rolled length indicated in FIG. 1 by the letter $a$ is less than the length of body 21 indicated in FIG. 1 by the letter $A$ allowing the sleeve to be contained within channel 28 and exposing crimpable sections 26 and 27. The unrolled length of the sleeve, however, which is indicated by the letter $b$ in FIG. 3 is greater than the length $A$ of body 21 allowing ends 30 and 31 to overlie crimpable sections 26 and 27, cavity entrances 22 and 23 and a portion of each of cable ends 24 and 25, respectively. Thus, there is provided insulation of the connector and sealing at the cavity entrances.

In FIG. 1 the assembly is shown with sleeve 29 semi-permanently assembled to body 21 of connector 20. The connector assembly including the sleeve 29 and body 21 is provided to the user who inserts ends 24 and 25 in position, as shown in FIG. 1, crimps the crimpable sections 26 and 27, as indicated in FIG. 2, by the numerals 26a and 27a, and rolls the ends 30 and 31 of the sleeve outwardly in the direction of the arrows as shown in FIG. 2 to provide the covering of cable ends, cavity entrances and connector body as shown in FIG. 3.

As is known in the art, the bore of the body 21 can be provided with conducting walls, corrosive resistance material or such other material as is desired. The elastomeric sleeve provides a complete insulating covering for the connector body and sealing at the cable entrances to the connector.

Figure 4:
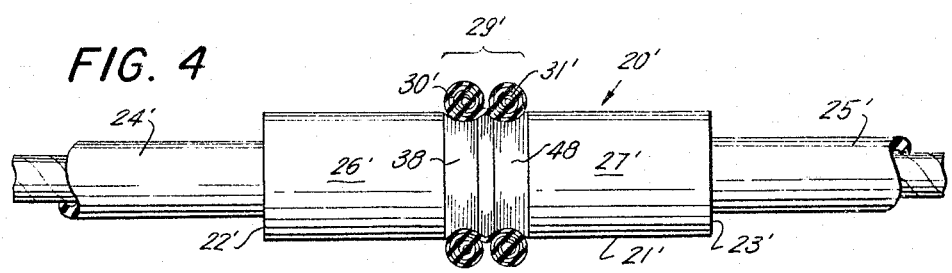
FIG. 4 is a side view of an alternate embodiment of the invention utilizing a compression connector shown prior to crimping of the connector.
Figure 5:
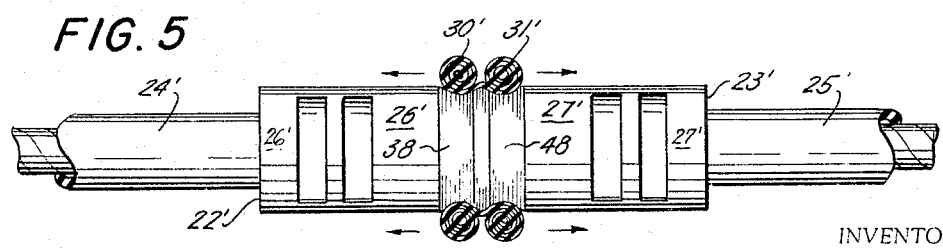
FIG. 5 is a side view of the connector shown in FIG. 4 after crimping.
Figure 6:
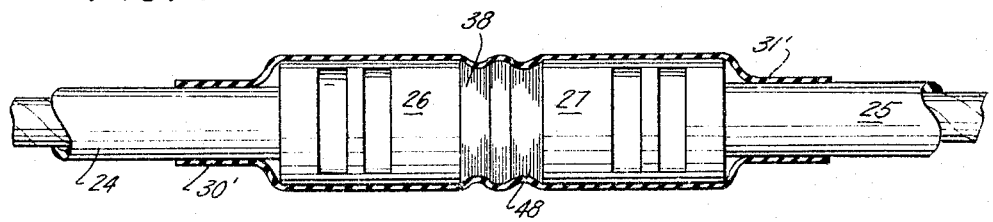
FIG. 6 is a side view of the assembly shown in FIGS. 4 and 5 with the insulation in final insulating and sealing position.

In FIGS. 4–6 an alternate embodiment of the invention is shown wherein connector 20′ includes a cylindrical body 21′ formed of a crimpable or deformable material having a longitudinal bore and cavity entrances 22′ and 23′ receiving cable ends 24′ and 25′ within the cavities in crimpable sections 26′ and 27′ of the connector, respectively. The crimpable sections 26′ and 27′ are separated by two cylindrical channels 38 and 48 receiving rolled ends 30′ and 31′ of elastomeric sleeve 29′. In this embodiment, as in the embodiment of FIGS. 1–3, the rolled length of the sleeve is less than the length of the connector body and the unrolled length of the sleeve is greater than the length of the connector body allowing ends 30′ and 31′ to overlie crimpable sections 26′ and 27′, cavity entrances 22′ and 23′ and a portion of each of cable ends 24′ and 25′, respectively. Thus, there is provided insulation of the connector and sealing of the cavity entrances in the embodiment disclosed in FIGS. 4–6.

The embodiment of FIGS. 4–6 is used in the same manner as the embodiment of FIGS. 1–3 as to crimping and rolling the elastomeric sleeve in position after the crimping has been accomplished.

Figure 7:
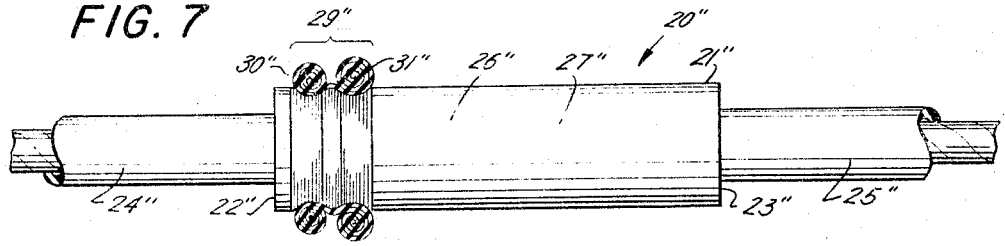
FIG. 7 is a side view of another embodiment of the invention utilizing a compression connector shown prior to crimping of the connector.
Figure 8:
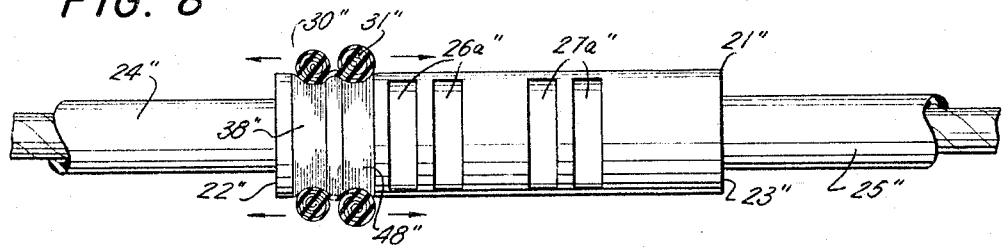
FIG. 8 is a side view of the connector shown in FIG. 7 after crimping.
Figure 9:
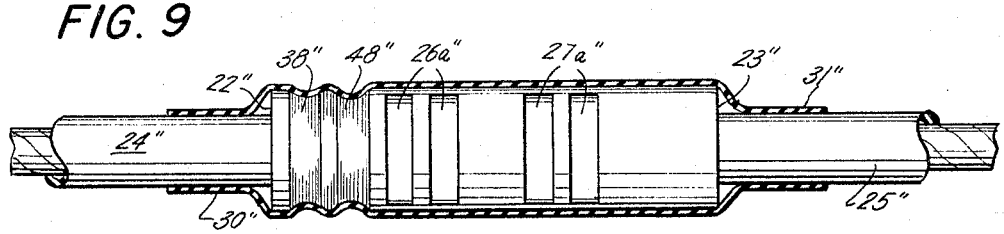
FIG. 9 is a side view of the assembly shown in FIGS. 7 and 8 with the insulation in the final insulating and sealing position.

Another embodiment of the invention is shown in FIGS. 7–9 in which connector 20" includes a cylindrical body 21" having cavity entrances 22" and 23" receiving cable ends 24" and 25" within the cavities in crimpable sections 26" and 27". The crimpable sections in the embodiment shown in FIGS. 7–9 are adjacent depressed zones 38" and 48" for receiving the rolled ends 30" and 31" of elastomeric sleeve 29" and are disposed between crimped section 26" and cavity entrance 22". It is necessary in this embodiment that the cable end 24" be extended within body 21" a sufficient distance to be within the bore cavity provided beneath crimped section 26" requiring insertion of the cable end further into the body of the connector than was required in the previous embodiments.

As in the embodiments previously described, the rolled length of sleeve 29" is less than the length of the body 21" and the unrolled length of the sleeve is greater than the length of body 21". It is noted, however, that in the unrolled condition of the sleeve, end 31" overlies crimpable sections 26" and 27" and cavity entrance 23" and a portion of cable end 25" whereas it is necessary that sleeve end 30" only overlie a small portion of body 21", cavity entrance 22" and a portion of cable end 24". Hence, in the embodiment disclosed in FIGS. 7–9 the rolled end 30" must be of a length sufficient to extend substantially the length of body 21" whereas the rolled end 30" can be a shorter length.

The invention disclosed in FIGS. 7–9 is used in the same manner as the embodiments previously discussed wherein the connector is provided with the sleeve in rolled condition within the channels 38" and 48" so that the cable ends 24" and 25" can be inserted in position, the crimps 26"a and 27"a formed and the sleeve ends 30" and 31" unrolled to provide sleeve 29" in its unrolled condition overlying the connector body, cavity entrances, and cable end portions providing insulation of the connector body and sealing at the cavity entrances.

Another embodiment of the invention is disclosed in FIG. 10 wherein a lug type connection 50 with a crimpable section 51 has assembled thereto semi-permanently an elastomeric sleeve 52 which is rolled and retained in channel 53. The cable end 54 is inserted through cavity entrance 55 within the crimpable section and crimps 56 and 57 applied. Sleeve 52 can then be unrolled to overlie crimpable section 51, cavity 55 and cable end portion 54 as is shown in phantom in FIG. 10 providing electrical insulation at the crimpable section 51 and sealing at cavity entrance 55. This embodiment is intended to exemplify any lug type connection or dead end whether forked, drilled hole or just a flat piece that slides in a receptacle.

In FIG. 11 a sleeve of insulating material 58 with one rolled end 59 is mounted over the insulation of cable 60 with the end of conductor 61 exposed for purposes of accomplishing a splice with the exposed conductor 62 of cable 63. The rolled sleeve of insulating material has been applied to the one cable prior to making the splice. The splice is then made and the sleeve unrolled over the splice with its ends covering a portion of the insulation of cables 60 and 63 adjacent the splice.

Thus, among others, the several objects in the invention as specifically aforenoted, are achieved. Obviously, numerous changes in construction and rearrangement of parts might be resorted to without departing from the spirit of the invention as defined by the claims.

We claim:

1. A cable connector for electrically connecting the facing ends of first and second cables including in combination a cylindrical body formed of an electrically conductive deformable material, first and second adjacent crimpable sections longitudinally displaced on said body, first and second cavities within said first and second crimpable sections respectively, first and second respective entrances to said cavities for receiving respective ends of said first and second cables, an elastomeric insulating sleeve having a longitudinal dimension greater than the longitudinal dimension of said connector, first and second ends of said insulating sleeve rolled toward one another providing a rolled length of said sleeve less than the length of said connector, a zone of said connector encircled by said sleeve longitudinally displaced from said first and second crimpable sections between said first cavity entrance and said first crimpable section whereby said cable ends can be retained within said respective crimpable sections and said sleeve extended to its full length overlying said connector and said cavity entrances to provide insulation of said sleeve and sealing at said cavity entrances said zone consisting of parallel cylindrical depressed portions of said connector providing parallel cylindrical channels receiving said first and second ends of said sleeve respectively in its rolled condition with said second end of said sleeve of greater length than said first end.

2. A lug connector of the type constructed and arranged to be connected to a cable end including a cylindrical crimpable section of said connector, a cavity within said crimpable section for receiving said cable end, an entrance to said cavity through which said cable end can project, an elastomeric insulating sleeve having a longitudinal dimension greater than the longitudinal dimension of said crimpable section, a zone of said connector between said crimpable section and said lug encircled by said sleeve in its rolled condition exposing said crimpable section whereby said cable end can be retained within said crimpable section and said sleeve extended to its full length overlying said crimpable section and said entrance to said cavity to provide insulation of said crimpable section and sealing at said entrance.

3. An assembly in accordance with claim 2 in which the zone encircled by said sleeve is a depressed portion of said connector providing a cylindrical channel receiving said sleeve in its rolled condition.

4. A cable connector for electrically connecting the facing ends of first and second cables including in combination a cylindrical body formed of an electrically conductive deformable material, first and second crimpable sections of said body adjacent respective ends of said body, first and second cavities within said first and second crimpable sections respectively, first and second respective entrances to said cavities for receiving respective ends of said first and second cables, an insulating sleeve having a longitudinal dimension greater than the longitudinal dimension of said connector, first and second ends of said insulating sleeve rolled toward one another providing a rolled length of said sleeve less than the length of said connector, a depressed portion of said connector between said crimpable sections providing a single cylindrical channel receiving said sleeve in its rolled condition whereby said cable ends can be retained within said respective crimpable sections and said sleeve extended to its full length overlying said connector and said cavity entrances to provide insulation of said sleeve and sealing at said entrances.

5. A cable connector for electrically connecting the facing ends of first and second cables including in combination a cylindrical body formed of an electrically conductive deformable material, first and second crimpable sections of said body adjacent respective ends of said body, first and second cavities within said first and second crimpable sections respectively, first and second respective entrances to said cavities for receiving respective ends of said first and second cables, an insulating sleeve having a longitudinal dimension greater than the longitudinal dimension of said connector, first and second ends of said insulating sleeve rolled toward one another providing a rolled length of said sleeve less than the length of said connector, two parallel depressed portions of said connector between said crimpable sections providing two parallel cylindrical channels receiving said first and second ends of said sleeve respectively in its rolled condition whereby said cable ends can be retained within said respective crimpable sections and said sleeve extended to its full length overlying said connector and said cavity entrances to provide insulation of said sleeve and sealing at said entrances.

References Cited by the Examiner

UNITED STATES PATENTS

| | | | |
|---|---|---|---|
| 2,674,647 | 4/1954 | Dibner | 174—87 |
| 2,883,220 | 4/1949 | Johnson | 287—78 |
| 3,011,010 | 11/1961 | Lively | 174—84 |

LEWIS H. MYERS, *Primary Examiner.*

DARRELL L. CLAY, *Examiner.*